Figure 1:
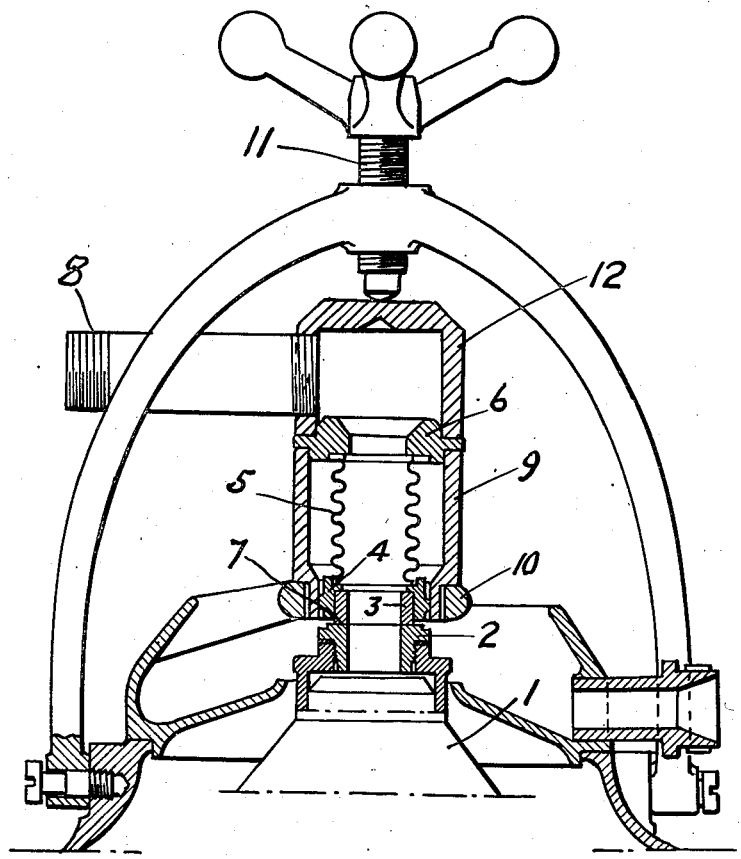

Jan. 2, 1951  G. H. ANDERSSON ET AL  2,536,793
SEALING DEVICE FOR CENTRIFUGAL SEPARATORS
Filed Feb. 28, 1946  5 Sheets-Sheet 1

WITNESS:

INVENTORS
Gustav Harry Andersson &
Henric Wilhelm Thylefors
BY
Busser and Harding
ATTORNEYS.

Jan. 2, 1951     G. H. ANDERSSON ET AL     2,536,793
SEALING DEVICE FOR CENTRIFUGAL SEPARATORS
Filed Feb. 28, 1946     5 Sheets-Sheet 4
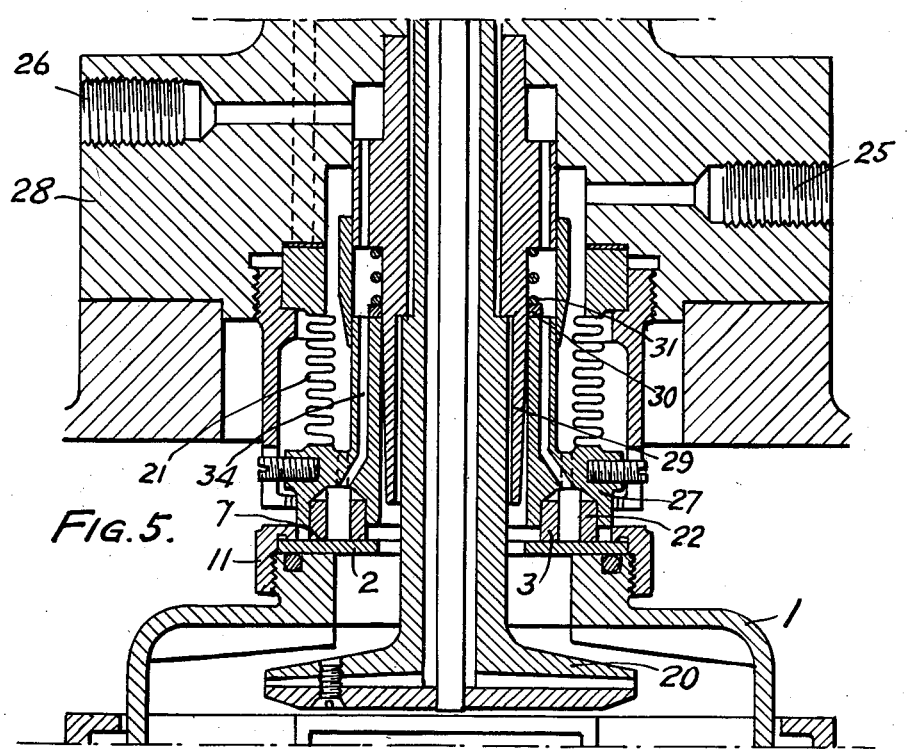
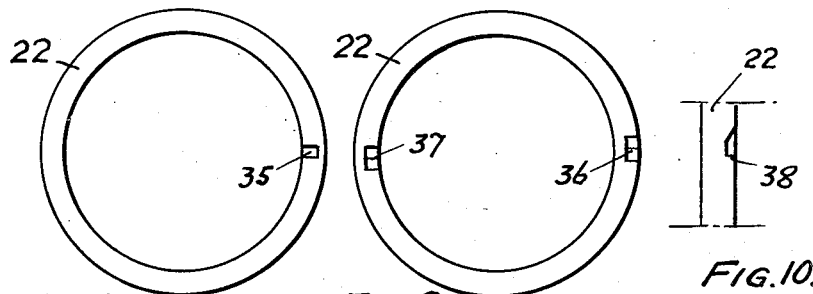
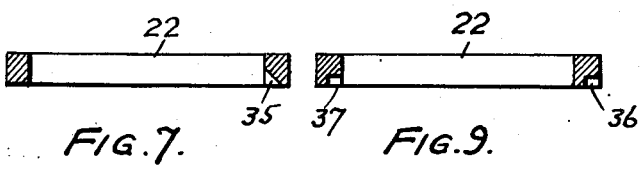
INVENTORS
Gustav Harry Andersson &
Henric Wilhelm Thylefors
BY
Busser and Harding
ATTORNEYS
WITNESS:

UNITED STATES PATENT OFFICE 2,536,793

SEALING DEVICE FOR CENTRIFUGAL SEPARATORS

Gustav Harry Andersson, Smedslatten, and Henric Wilhelm Thylefors, Stockholm, Sweden, assignors to Aktiebolaget Separator, Stockholm, Sweden, a corporation of Sweden Application February 28, 1946, Serial No. 650,798
In Sweden March 2, 1945

19 Claims. (Cl. 285—10)

The present invention refers to an arrangement for conveying matter to be treated or which has already been treated in centrifugal separators, from a fixed piping into a rapidly rotating centrifugal bowl through a tight connection between the piping and the bowl, or for discharging the matter through such a tightening device from the separator into a fixed piping. Such a hermetic conveyance to and from a centrifugal machine is a complicated problem, partly because of the high speed of the centrifugal bowl and partly because of the bowl generally having one single fixed bearing only, the other bearing being resilient. Thus the bowl may deviate radially in a relatively high degree. These movements are caused by the unbalance of the bowl arising during the separation. For forces ensuing from the unbalance often cause the bowl spindle to bend, and so, for instance, the top of the bowl may move in very complicated trajectories.

Some arrangements for obtaining a tight connection between a fixed piping and a rotating centrifugal bowl are already in use, but they all possess many disadvantages. Thus an arrangement provided with a rubber membrane has been proposed, having a cylindrical sleeve which tightens against a cylindrical spigot attached to the centrifugal bowl. This arrangement is not practical, the cylindrical tightening surface causing a heavy leakage of the liquid to be treated because a sleeve of exactly the same diameter as the spigot cannot of course be used. If the sleeve is made of an elastic material, for instance of rubber, the leakage can be reduced, but friction may make the material's temperature rise and it may get damaged. Besides this, said device has the disadvantage that the sleeve partakes in all the movements of the spigot, and hence the membrane's material is subjected to stress and strain. Instead of the membrane an expansion bellows may be used, which offers many advantages but cannot, either, stand the stresses when the radial movements become too great. Other known tightening devices permit great radial movements but cause secondary leakages through the guiding surfaces of the tightening members. Some of the known tightening devices may very well be used in slow-rotating machines or in machines where a liquid possessing good lubricating properties is present. They do not, however, suit centrifugal machines, which generally rotate at high speed and in which leakage of liquids out of the machine must be avoided and no leakage between the liquids flowing through it must take place.

The present invention refers to such a liquid-conveying device, as satisfies the requirements exacted from it with regard to its use in centrifugal machines and which is characterized by at least one plane or nearly plane and circular tightening surface mainly at right angles to the axis of the centrifugal bowl. The liquid being separated flows inside and lubricates the tightening surface which is formed by two parts in contact with each other, one of which is carried by the expansion bellows. It is practical to connect the expansion bellows to a stationary piping, and to attach the part pressing against the tightening part of the expansion bellows to the centrifugal bowl. The invention affords a simple and very good solution to the complicated problems having to do with centrifugal machines. By its use, a very good tightening is ensured. Only a very thin liquid film will separate the rotating part of the tightening device from the stationary one and thus only a very insignicant leakage can take place. Furthermore, the tightening part connected to the expansion bellows will partake, if light, with no resistance, in any angular movements of the tightening surface, usually caused by the bowl-spindle bending. Yet the tightening part connected to the expansion bellows need not partake in such changes, often large and subjecting the material to great stress, where the surface moves in its own plane. These movements are generally caused by an off-balance of the centrifugal bowl.

The pressure ensuring the contact between the parts of the tightening device is obtained in the most simple way from the tension in the expansion bellows. By giving a suitable diameter to the expansion bellows in relation to that of the tightening surface, the pressure is maintained nearly constant independently of the pressure in the liquid to be separated, which can vary considerably in centrifugal machines. Hence the lubricating properties of the liquid being separated will be sufficient, in connection with the use of an appropriate material, to prevent the device from getting too hot, in spite of the high velocity. Sometimes the effective pressure diameter of the expension bellows may be somewhat larger than the average diameter of the tightening surface. Then a higher contact-pressure between the parts is obtained when the pressure in the liquid to be separated rises; this may be allowed within certain limits because, with a higher pressure in the liquid, the leakage at the tightening surface will also increase and thus the lubrication of the parts in contact with each other is thereby facilitated.

In certain cases the tightening surface may have a shape other than plane, for instance it may be spherical.

Figure 3:
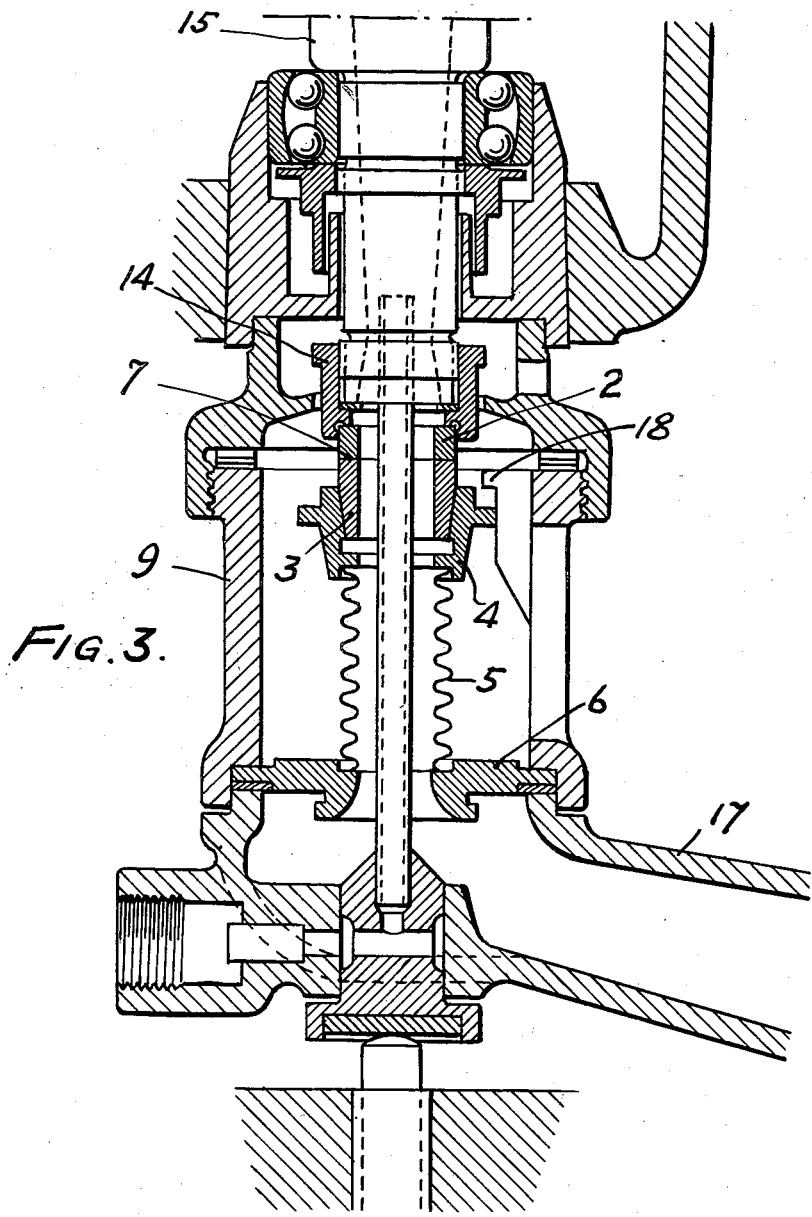
Figure 4:
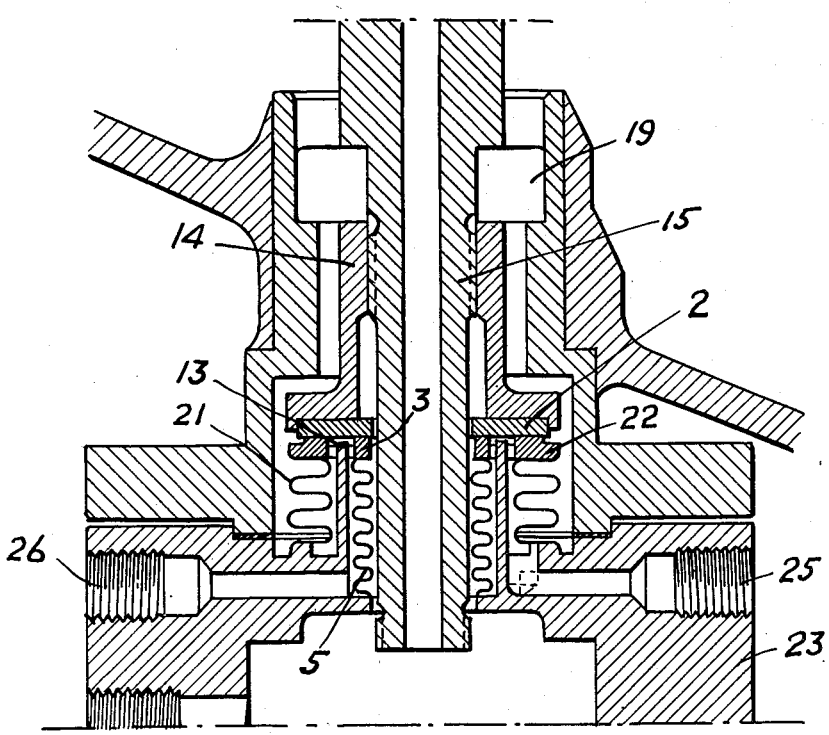

The invention is shown on the attached drawings. Figs. 1, 2, 3 and 11 show cross-sections through the upper part of a centrifuge, provided with different embodiments of the invention. Figs. 3 and 4 show the arrangement applied to the lower end of a spindle in a centrifuge, and illustrate a cross-section. Figs. 6–10 show plan views and elevations of stationary tightening parts and Fig. 12 a plan view of the rotating tightening parts.

In Figure 1, 1 is the hood of a centrifugal bowl, into the top of which an annular tightening or sealing element or part 2 is screwed, the latter being suitably made of hard hardened steel. The part 2 is provided with a ground plane tightening or sealing surface 7, which contacts a non-rotating annular tightening or sealing element or part 3, inserted in a circular guiding part 4. This latter part 4 is preferably soldered to the expansion bellows 5, which carries at its upper end a disc 6, soldered on to it and in connection with an armature part 12 and a discharge pipe 8. Thus, the parts 2 and 3 define a passage communicating with the bowl and with a fixed pipe 8. As shown, the liquid discharged from the centrifuge will flow through the passage within the parts 2 and 3 and the expansion bellows 5 into the discharge pipe 8, and will at the same time lubricate the tightening surface 7. The tightening ring 3 is made of a soft material possessing good lubricating properties, for instance of carbon, Bakelite, Phosphor bronze, self-lubricating bearing metal or the like. The holder 4 is axially movable but radially locked in the sleeve 9, which is screwed into the frame 10. The disc 6 is clamped by the wing-nut 11, between the armature part 12 and the sleeve 9.

Figure 2:
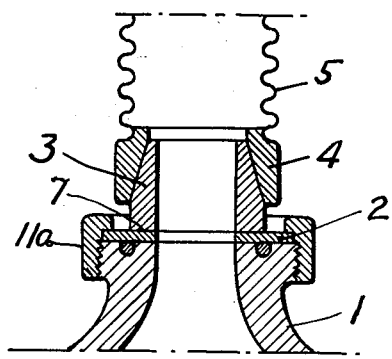

As shown in Fig. 2 the tightening part 3 is conical and easily replaceable and the tightening part 2 has the form of a disc, fixed in the upper part of the bowl and held to the top of the latter by the ring-nut 11a. In this way the finely polished sliding surface of the element 2 is protected by the upper edge of the ring-nut 11 when the centrifuge is being disassembled for cleaning. The liquid channel through the tightening device may, just after the point where the tightening takes place, widen out in a diffuser-like fashion, and thus the pressure of the liquid will be lower at the place of the tightening than it would be if the channel had a uniform width.

When the liquid to be separated is easily ignitable, it is suitable to make the part 3 of a metal with a lower melting-point than the ignition-temperature of the liquid. In this way a real safeguard against accidents is ensured. An arrangement intended for such liquids is shown in Figure 3, where it is seen applied to the inlet for the liquid at the lower end of a hollow separator spindle. If the circulation of the liquid ceases the tightening surface may get hot and the material melt; the tightening part would thus wear down. In this case the holder 4 will move slowly towards the spindle end. To prevent the holder from finally coming into contact with the rotating parts, a stop 18 is provided, which limits its movements. According to the present invention, the rotating parts consist of a disc 2 of a hard hardened material, and which is pressed down into the holder 14, made of a softer material and screwed on to the spindle end 15. A suitable material for the tightening part 3 is a bearing metal having a low melting point lying below the ignition temperature of the combustible liquids, which is usually above 350–400° C. In those cases where the liquid to be separated dries very quickly and deposits on the expansion bellows as a hard crust, it is practical to make the housing 9 quite enclosed and to fill it with liquid to be separated, thereby preventing the liquid from drying. The main inlet to the centrifuge is designated by the reference numeral 17.

Fig. 4 shows an embodiment in which more expansion bellows together with tightening elements are provided outside each other. The holder 14 for the rotating tightening disc serves as a nut for the lower ball bearing 19 of the hollow bowl spindle 15. The nut carries a tightening disc 2 against which two tightening rings 3 and 22, placed concentrically outside each other, press. Each of the tightening rings carries one expansion bellows 5 and 21 respectively. The bellows are fixed at their other ends to the part 23, which has a cylindrical partition wall 13 extending in between the bellows 5 and 21 and guiding the tightening rings in a radial direction. In the holder 23 there are the channels 25 and 26, leading to the spaces on either side of the wall 13. A liquid can flow into the space between the inner expansion bellows 5 and the intermediate wall 13 through the channel 26 and be discharged thence through the channel 25. The liquid thus flowing in the channels serves to cool the tightening elements and also as a sealing-liquid for the liquid to be separated, fed into the spindle, i. e. it prevents the liquid to be separated from flowing into the space outside the outer expansion bellows 21. Such an arrangement is required if, for instance, the liquid to be separated contains dissolved gases easily ignitable and explosive, and whose presence in the room outside the separator has to be prevented. The pressure on the sealing-liquid should preferably be higher than that on the liquid to be separated, for in this case sealing-liquid will leak into the liquid to be separated and not the contrary.

Fig. 5 shows a similar arrangement with a sealing-liquid tightening applied to an outlet of the centrifuge. The liquid being separated is discharged by a paring disc 20 surrounded concentrically by a stationary holder 27 supporting the tightening rings 3 and 22. These rings are in contact with a plane tightening disc 2 fastened to the bowl hood 1. The holder 27 is connected to a part 28 in the separator hood by means of a bellows 21 and is guided by a bored spigot 29. The guiding takes place only at the upper end of the holder. The spigot 29 is cylindrical there, while at its lower end it is conical whereby the holder 27 may be tilted in a limited angle in relation to the spigot 29, whereby the holder can adjust itself to the surface of the disc. The leakage is diminished by a ring 30 which is pressed by a spring 31 towards the joint between the holder 27 and the spigot 29. The tiltability of the holder is necessary so that the tightening surfaces shall have contact with one another during the movements of the bowl spindle.

Through the channels 26, 34 and 25 the sealing-liquid circulates near the tightening surfaces, thus cooling them.

At the tightening-place 7, between the rotating parts and those stationary, a liquid film is formed, which is caused by the small swinging movements of the bowl about its geometric centre line. As a consequence, the tightening elements will rotate eccentrically in relation to each other and certain portions of the rotating tightening surface may, during one revolution, alternately be free and alternately in contact with the stationary surface. When the surface is free, it gets moistened by the liquid being separated or by the sealing-liquid. As a result of the relatively high speed between the tightening parts, the liquid adhering to the surface will get into the play between the two tightening elements and form a thin liquid film there, which will slowly disperse outwards. A liquid film arising in this way can of course only take up a limited load. In those cases where the speed and/or the load are very high a thicker liquid film may be obtained if the tightening rings are provided with oil-grooves, as shown in Figs. 6–10. The Figs. 6 and 8 show a horizontal view of two different tightening rings, and Figs. 7 and 9 a sectional cut of them through the oil-groove, and Fig. 10 a side view of the tightening ring according to Fig. 8. 22 indicates the tightening ring and 35 a groove in it. The groove 35 extends from the inner edge of the tightening ring over somewhat more than half of the ring-width towards its outer edge without reaching the latter. The inner portion of the tightening surface is thus moistened by the groove, a thin liquid film being formed between the tightening ring and the tightening disc. In order to prevent an extensive leakage of liquid, the groove does not extend through the entire ring. Fig. 8 shows a tightening ring provided with two grooves 36 and 37. By the shape and position of the grooves the whole of the tightening surface will thus be lubricated, and at the same time there will be no great leakage. One of the grooves, 36, extends from the outer edge of the ring over somewhat over half of the ring-width towards the inner edge of the ring, whereas the other groove 37 extends from the inner edge of the ring over half of the ring-width towards its outer edge. The grooves may of course be more than two but they should then be located alternately so that the leakage will be small. The shape of the section of the grooves is of importance for the thickness of the liquid layer serving as a lubricant. If the edge 38 of the groove, absorbing the liquid pressure created by the speed of the liquid film in relation to the ring, is at right angles to the tightening surface or forms an obtuse angle to it, the liquid film will be thin and the leakage small; if it forms an acute angle to the tightening surface the liquid film will be thicker. By adapting the section of the groove accordingly, the suitable film-thickness may be obtained for a certain lubricant.

Figure 11:
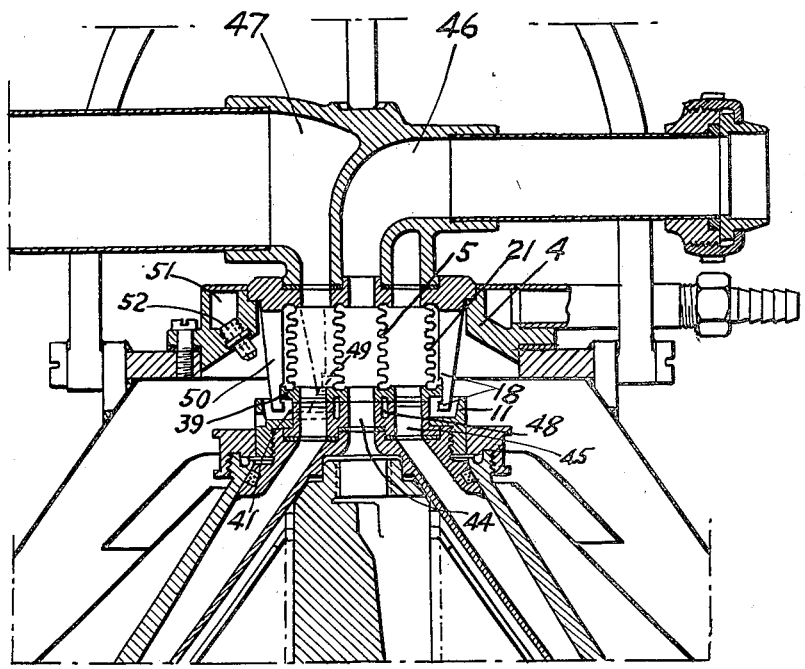
Figure 12:
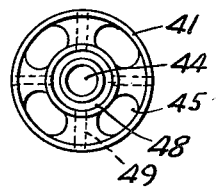

Fig. 11 illustrates an embodiment used to convey two liquid components from the bowl into two separate fixed pipings. The disc 41, fixed in the bowl-hood by the nut 11, is provided with channels 44 and 45 for two different liquid components. The shape of the disc is more clearly to be seen from Fig. 12, which shows a horizontal view. The channels 44 and 45 communicate with the separating chamber in the bowl. The stationary tightening element, the disc 39, is, like the part 41, provided with channels for each of the liquid components, which are conveyed inside the inner expansion bellows 5 and between it and the outer one 21 into the discharge pipes 46 and 47. It is important that the two liquid components do not leak into each other at the tightening place, and to prevent this, the disc 41 is provided with a circular groove 48 at the tightening surface between the two channels 44 and 45. This groove 48 communicates with radial channels 49, through which the liquid leaking out in the groove is discharged. The disc 39 with the expansion bellows soldered to it is an arrangement which must be well protected from being damaged and for this purpose the disc to which the other ends of the expansion bellows are soldered, is provided with bars 50 which protect the disc 39 and the expansion bellows and have also stops 18, which prevent the expansion bellows from being stretched out or compressed in an impermissible degree. The disc 39 is provided with suitable grooves for the bars 50 and, by turning and fitting in the part 39, the arrangement can be assembled.

It has been found that the tightening devices can function a very long time even without any liquid circulation through them, if they are cooled in a satisfactory way. This is of importance in such cases where the flow of any of the liquid components may be interrupted during operation. A good cooling can be ensured by providing the tightening elements with cooling flanges, against which for instance air is thrown by wings attached to the rotating parts. However, a better way is to use water-cooling, and Fig. 11 shows an arrangement for this latter. The water is fed into a circular space 51 in the cover 4, and, through the nozzles 52 arranged at appropriate angles, the liquid is thrown on to the tightening elements, which may be cup-shaped like the nut 11 so that the water is greatly agitated. Because of the rotation and the speed of the water, the heat-transmission between the latter and the metal elements will be very good. The heated cooling water is thrown out by the centrifugal force and discharged into a collecting vessel.

An alternative for cooling the tightening elements is an arrangement where these elements contain channels through which a cooling liquid is circulated.

In the foregoing, we have referred to the tightening surfaces as being "plane or nearly plane" and "mainly at right angles to the axis of the centrifugal bowl." Thus, these surfaces may be more or less spherical and have their center of curvature located in the center of oscillation of the bowl spindle, which center may be said to be located approximately at the lower point of support of the bowl spindle. In other words, the tightening surfaces may be faintly vaulted so that the rotating tightening surface may swing about the center of oscillation of the bowl spindle. In the following claims, the designation of the tightening surface as "substantially plane" and "substantially normal" to the rotation axis is intended to include the above-noted arrangement.

We claim:

1. In a centrifugal separator having a fixed pipe and a rotating separator bowl in communication with the fixed pipe, the improvement which comprises an annular part forming a substantially plane, annular tightening surface rotatable with said bowl and movable therewith substantially in a plane normal to the axis of rotation, a second annular part forming a substantially plane, annular tightening surface in contact with said first surface, the planes of said surfaces being disposed at generally right angles to the axis of rotation of said bowl whereby the rotatable surface is adapted to move laterally with respect to said second surface while in contact therewith, the two annular parts defining a passage communicating with the bowl and the fixed pipe, an expansion bellows urging said second part toward said rotatable part to hold the tightening surfaces together, and a guide adjacent the second tightening part for accommodating axial movement thereof while confining the same against substantial lateral displacement relative to said axis.

2. The improvement as defined in claim 1, in which the average diameter of said tightening surfaces is smaller than the effective pressure diameter of the bellows, thereby providing an effective seal at said surfaces at varying pressures of the material flowing through said passage.

3. The improvement as defined in claim 1, comprising also a lateral projection movable axially with the bellows incident to wear of one of the tightening surfaces, and a stop engageable by the projection to limit expansion of the bellows due to such wear.

4. The improvement as defined in claim 1, in which said annular parts have a melting point below the ignition temperature of the material to be separated, the combination also comprising a lateral projection movable axially with the bellows incident to wear of one of the tightening surfaces, and a stop engageable by the projection to limit expansion of the bellows due to such wear.

5. The improvement as defined in claim 1, comprising also a second expansion bellows disposed concentrically with respect to the first bellows and exerting a tightening pressure against said rotatable part, the bellows defining a fluid passage between them.

6. The improvement as defined in claim 1, comprising also a second expansion bellows disposed concentrically with respect to the first bellows and exerting a tightening pressure against said rotatable part, the bellows defining a fluid passage between them communicating with said first passage.

7. The improvement as defined in claim 1, comprising also a second expansion bellows disposed concentrically with respect to the first bellows and exerting a tightening pressure against said rotatable part through the other annular part, said annular parts defining a central passage and also an outer passage both communicating with the bowl for outflow of separated products therefrom, the inner bellows forming an extension of said central passage and also forming with the outer bellows an extension of said outer passage, one of said extensions communicating with said fixed pipe, and a second fixed pipe communicating with the other of said extensions.

8. The improvement as defined in claim 1, comprising also a second expansion bellows disposed concentrically with respect to the first bellows and exerting a tightening pressure against said rotatable part, the bellows defining a fluid passage between them and adjacent said tightening surfaces, and means providing an inlet to and an outlet from said last passage for circulating a sealing fluid therethrough.

9. The improvement as defined in claim 1, comprising also a third annular part concentric with said second part and having a tightening surface engageing said rotatable surface, a second expansion bellows disposed concentrically with respect to the first bellows and exerting a tightening pressure against said rotatable part through said third part, and a partition extending between the bellows and forming therewith a passage for circulating a sealing liquid adjacent the tightening surfaces and between said second and third annular parts.

10. The improvement as defined in claim 1, comprising also a spigot having a generally cylindrical guiding surface, and a holder for said second annular part and mounted on said guiding surface for rocking movement thereon, the holder being disposed concentrically with respect to the bellows and urged thereby toward said rotatable part to hold the tightening surfaces together.

11. The improvement as defined in claim 1, comprising also a spigot having a generally cylindrical guiding surface, a holder for said second annular part and mounted on said guiding surface for rocking movement thereon, the holder being disposed concentrically with respect to the bellows and urged thereby toward said rotatable part to hold the tightening surfaces together, a ring at the joint between the holder and the guiding spigot, and a spring urging the ring against said joint.

12. The improvement as defined in claim 1, comprising also means for delivering a cooling medium to said annular parts to cool the tightening surfaces.

13. A sealing device for a centrifugal separator having a rotatable bowl and a stationary pipe adjacent the bowl, the sealing device comprising an annular sealing element rotatable with the bowl and having a substantially plane, annular sealing surface substantially normal to the bowl axis, a second annular sealing element having a substantially plane, annular sealing surface substantially normal to the bowl axis and engaging the first sealing surface, said elements defining a passage extending within the respective sealing surfaces, an expansion bellows secured at one end to the fixed pipe and at the other end to the second sealing element around said passage and acting upon said last element to urge said surfaces together with a yielding pressure, whereby said second element participates in tilting movements of the first element during rotation of the bowl, the bellows forming an extension of said passage communicating with the interior of the bowl and also with the interior of the fixed pipe, and a guide adjacent the second sealing element for accommodating axial movement thereof while confining the same against substantial lateral displacement relative to said axis.

14. A sealing device for a centrifugal separator having a rotatable bowl and a stationary pipe adjacent the bowl, the sealing device comprising an annular sealing element rotatable with the bowl and having a plane, annular sealing surface substantially normal to the bowl axis, a pair of concentric rings each having a plane, annular sealing surface substantially normal to the bowl axis and engaging the first sealing surface, said element and the inner ring defining a passage extending through said element and communicating with the bowl interior and also with the fixed pipe, the rings forming between them a second passage sealed from the first passage by said sealing surfaces, and expansion bellows secured between each ring and the fixed pipe to urge the ring sealing surfaces against the first sealing surface, whereby the rings participate in tilting movements of said element during rotation of the bowl.

15. A sealing device for a centrifugal separator having a rotatable bowl and a stationary pipe adjacent the bowl, the sealing device comprising an annular sealing element rotatable with the bowl and having a substantially plane, annular sealing surface substantially normal to the bowl axis, a pair of concentric rings each having a substantially plane, annular sealing surface substantially normal to the bowl axis and engaging the first sealing surface, said element and the inner ring defining a passage extending through said element and communicating with the bowl interior and also with the fixed pipe, the rings forming between them a second passage sealed from the first passage by said sealing surfaces, an expansion bellows secured at one end to the fixed pipe, and a holder for the rings secured to the other end of the bellows, the bellows acting through the holder to urge the ring sealing surfaces against the first sealing surface, whereby the rings participate in tilting movements of said element during rotation of the bowl.

16. A sealing device for a centrifugal separator having a rotatable bowl and a stationary pipe adjacent the bowl, the sealing device comprising an annular sealing element rotatable with the bowl and having a plane, annular sealing surface substantially normal to the bowl axis, a pair of concentric rings each having a plane, annular sealing surface substantially normal to the bowl axis and engaging the first sealing surface, said element and the inner ring defining a passage extending through said element and communicating with the bowl interior and also with the fixed pipe, the rings forming between them a second passage sealed from the first passage by said sealing surfaces, an expansion bellows secured at one end to the pipe and at the other end to the inner ring to urge the sealing surface thereof against said first surface, the interior of the bellows forming part of said first passage, and a second expansion bellows secured to the outer ring to urge the sealing surface thereof against said first surface, the second bellows surrounding the first bellows and defining therewith an annular space forming part of said second passage.

17. A sealing device according to claim 16, comprising also means affording a liquid inlet to and a separate liquid outlet from said second passage.

18. A sealing device for a centrifugal separator having a rotatable bowl and a stationary pipe adjacent the bowl, the sealing device comprising an annular sealing element rotatable with the bowl and having a plane, annular sealing surface substantially normal to the bowl axis, a second annular sealing element having a plane, annular sealing surface substantially normal to the bowl axis and engaging the first sealing surface, said elements defining a passage extending within the respective sealing surfaces, a pair of concentrically arranged expansion bellows secured to the second sealing element and urging the same against said first surface, the interior of the inner bellows forming an extension of said passage and communicating with the bowl interior and also with the pipe, the bellows forming between them an annular space having a liquid inlet and a liquid outlet, at least one of the sealing surfaces having a groove for collecting liquid leaking along the sealing surfaces between said passage and space, and means affording an outlet from said groove for discharging leakage therefrom.

19. A sealing device according to claim 13, in which one of the sealing elements is made of a material having a melting point below the ignition temperature of the liquid to be separated.

GUSTAV HARRY ANDERSSON.
HENRIC WILHELM THYLEFORS.

REFERENCES CITED

The following references are of record in the file of this patent:

UNITED STATES PATENTS

| Number | Name | Date |
| --- | --- | --- |
| 1,561,784 | Hall | Nov. 17, 1925 |
| 1,588,126 | Meyer et al. | June 8, 1926 |
| 1,688,172 | Aldrich et al. | Oct. 16, 1928 |
| 1,859,975 | Malkin | May 24, 1932 |
| 2,002,954 | Lindgren | May 28, 1935 |
| 2,240,141 | Lindgren | Apr. 29, 1941 |
| 2,302,578 | Serrell | Nov. 17, 1942 |
| 2,381,432 | Bratton | Aug. 7, 1945 |
| 2,402,224 | Hornbostel | June 18, 1946 |
| 2,404,783 | Blom | July 30, 1946 |

FOREIGN PATENTS

| Number | Country | Date |
| --- | --- | --- |
| 44,329 | Holland | Oct. 15, 1938 |